(12) United States Patent
Bergquist et al.

(10) Patent No.: US 12,415,496 B2
(45) Date of Patent: Sep. 16, 2025

(54) METHOD FOR ASSESSING RELIABILITY OF A BRAKE ASSEMBLY OF A VEHICLE (71) Applicant: Volvo Truck Corporation, Gothenburg (SE)

(72) Inventors: Stefan Bergquist, Gothenburg (SE); Linus Hagvall, Gothenburg (SE); Christian Grante, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 149 days.

(21) Appl. No.: 18/568,809

(22) PCT Filed: Jun. 18, 2021

(86) PCT No.: PCT/EP2021/066688
§ 371 (c)(1),
(2) Date: Dec. 9, 2023

(87) PCT Pub. No.: WO2022/262999
PCT Pub. Date: Dec. 22, 2022

(65) Prior Publication Data
US 2024/0270226 A1 Aug. 15, 2024

(51) Int. Cl.
*B60T 17/00* (2006.01)
*B60T 7/22* (2006.01)
(Continued)

(52) U.S. Cl.
CPC .............. *B60T 17/22* (2013.01); *B60T 7/22* (2013.01); *B60W 10/04* (2013.01);
(Continued)

(58) Field of Classification Search
CPC .......... B60T 17/22; B60T 17/221; B60T 7/22; B60T 2210/32; B60T 2270/406;
(Continued)

(56) References Cited

U.S. PATENT DOCUMENTS

2001/0013724 A1* 8/2001 Shimizu ................ B60T 8/1766
303/186
2017/0291591 A1 10/2017 Steer et al.
(Continued)

FOREIGN PATENT DOCUMENTS

EP 2326540 B1 12/2016
EP 3753794 A1 12/2020
(Continued)

OTHER PUBLICATIONS

International Search Report and Written Opinion for International Patent Application No. PCT/EP2021/066688, mailed Feb. 25, 2022, 13 pages.

*Primary Examiner* — Phutthiwat Wongwian
*Assistant Examiner* — Sherman D Manley
(74) *Attorney, Agent, or Firm* — Withrow & Terranova, PLLC (57) ABSTRACT

A method for assessing reliability of a brake assembly of a vehicle. The brake assembly comprises brake system, nominal automation system and safety system. The brake system is adapted to receive a brake request individually from each one of the nominal automation system and the safety system and in response, initiate a braking operation. The method comprises determining an actual braking operation density, the actual braking operation density determined on the basis of at least a subset of occurrences per unit time when a braking operation is initiated by the brake system; in response to detecting that the actual braking operation density is lower than a braking operation reference density, issuing a brake request from the safety system; detecting a response of the brake system to the signal issued from the safety system, and on the basis of at least the detected response, assessing the reliability of the brake assembly.

37 Claims, 3 Drawing Sheets

(51) Int. Cl.
  *B60T 17/22*      (2006.01)
  *B60W 10/04*      (2006.01)
  *B60W 10/184*     (2012.01)
  *B60W 30/09*      (2012.01)
  *B60W 30/095*     (2012.01)
  *B60W 50/02*      (2012.01)
  *B60W 60/00*      (2020.01)

(52) U.S. Cl.
  CPC .......... *B60W 10/184* (2013.01); *B60W 30/09* (2013.01); *B60W 30/0956* (2013.01); *B60W 50/0205* (2013.01); *B60W 60/0015* (2020.02); *B60T 2210/32* (2013.01); *B60T 2270/406* (2013.01); *B60W 2554/00* (2020.02); *B60W 2710/18* (2013.01)

(58) Field of Classification Search
  CPC ...... B60T 8/172; B60T 13/662; B60W 10/04; B60W 10/184; B60W 30/09; B60W 30/0956; B60W 50/0205; B60W 60/0015; B60W 2554/00; B60W 2710/18
  See application file for complete search history.

(56) References Cited

U.S. PATENT DOCUMENTS

| | | | |
|---|---|---|---|
| 2019/0077315 A1* | 3/2019 | Salter | B60R 1/062 |
| 2019/0135257 A1 | 5/2019 | Medinei et al. | |
| 2019/0263373 A1* | 8/2019 | Jimenez | B60T 8/325 |
| 2020/0156602 A1* | 5/2020 | Wiehen | B60T 7/12 |
| 2025/0001996 A1* | 1/2025 | Kling | B60T 17/222 |

FOREIGN PATENT DOCUMENTS

| | | |
|---|---|---|
| WO | 2020104066 A1 | 5/2020 |
| WO | 2022262999 A1 | 12/2022 |

\* cited by examiner

METHOD FOR ASSESSING RELIABILITY OF A BRAKE ASSEMBLY OF A VEHICLE

This application is a 35 USC 371 national phase filing of International Application No. PCT/EP2021/066688, filed Jun. 18, 2021, the disclosure of which is incorporated herein by reference in its entirety.

TECHNICAL FIELD

The invention relates to a method for assessing reliability of a brake assembly of a vehicle. Moreover, the invention relates to a method for assessing reliabilities of a brake assembly of a vehicle. Furthermore, the present invention relates to each one of a computer program and a computer readable medium. Further, the present invention relates to a brake assembly for a vehicle. Additionally, the present invention relates to a vehicle.

The invention can be applied in heavy-duty vehicles, such as trucks, buses and construction equipment. Although the invention will be described with respect to a truck, the invention is not restricted to this particular vehicle, but may also be used in other vehicles such as working machines or cars.

BACKGROUND

A vehicle often comprises one or more brake systems for braking the vehicle. For vehicles in general, but in particular for automated vehicles, it is generally desired to monitor the reliability of at least one of the brake systems. For instance, WO 2020/104066 A1 proposes a method for monitoring brake performance of a brake system, which method comprises detecting a brake delay.

However, although the method presented in WO 2020/104066 A1 may provide useful information as regards the reliability of a brake, it would be desired to further refine a method by which braking reliability is assessed.

SUMMARY

As such, an object of the present invention is to provide a method for assessing a brake assembly of a vehicle, which method results in appropriate information as regards the reliability of the brake assembly.

According to a first aspect of the invention, the object is achieved by a method according to claim 1.

As such, the first aspect of the present invention relates to a method for assessing reliability of a brake assembly of a vehicle. The brake assembly comprises a brake system, a nominal automation system and a safety system. The brake system is adapted to receive a brake request individually from each one of the nominal automation system and the safety system and in response to either request initiate a braking operation.

The method comprises:
  determining an actual braking operation density, the actual braking operation density being determined on the basis of at least a subset of occurrences per unit time when a braking operation is initiated by the brake system;
  in response to detecting that the actual braking operation density is lower than a braking operation reference density:
    issuing a brake request from the safety system;
    detecting a response of the brake system to the signal issued from the safety system, and
    on the basis of at least the detected response, assessing the reliability of the brake assembly.

The above method implies that the reliability of the brake assembly, in particular the reliability of the safety system, is assessed appropriately often. As such, the above method implies that the reliability of the safety system is evaluated even when there is an insufficient number of braking operations initiated by the brake assembly during operation of the vehicle, which braking operations could be used for assessing the reliability of the brake assembly. Furthermore, by virtue of the fact that braking reliability is evaluated in response to detecting that the actual braking operation density is lower than a braking operation reference density, it is ensured that braking evaluation is not carried out unnecessarily often. As may be realized, braking evaluation with an unnecessarily high evaluation frequency may result in a less comforting ride for an operator or a passenger of the vehicle. Furthermore, an overly frequent brake evaluation may result in undesired wear of e.g. the brake system.

Optionally, the braking operation reference density is determined on the basis of an expected number of occurrences per unit time when a safety critical braking operation is to be initiated by the brake system. Preferably, the braking operation reference density is determined on the basis of the expected number of occurrences per unit time multiplied by a safety factor. Determining the braking operation reference density on the basis of safety critical braking operation expectance implies that that the reliability of the brake assembly can be assessed more often than the brake assembly is actually used for safety critical braking operations. This in turn implies that the reliability of the brake assembly, in particular the reliability of the safety system, can be assessed so often that reliability of the brake assembly or the safety system may be deemed to have an appropriately high level of integrity.

Optionally, the braking operation reference density is determined on the basis of a reference subset of occurrences per unit time when a braking operation is initiated by the brake system. The braking operation reference density is determined on the basis of the number of occurrences per unit time in the reference subset. Preferably, the braking operation reference density is indicative of the number of occurrences per unit time in the reference subset multiplied by a safety factor. As such, the braking operation reference density may be determined taking the actual and prevailing driving conditions into account which in turn implies that the reliability of the brake assembly is assessed sufficiently often, but not too often, in view of the current driving condition of the vehicle.

Optionally, the reference subset of occurrences per unit time when a braking operation is initiated corresponds to occurrences per unit time when a safety critical braking operation is initiated. Basing the subset of occurrences per unit time on safety critical braking operation occurrences per unit time may provide an appropriate subset of occurrences per unit time indicative of how often the reliability of the brake assembly should be assessed in order to be deemed sufficiently safe for safety critical braking operations.

Optionally, the reference subset of occurrences per unit time when a braking operation is initiated corresponds to occurrences per unit time when a braking operation is initiated in an operating situation in which a failure to brake the vehicle is determined to result in personal injury of one or more persons related to the operating situation. The above implies an appropriate example set of occurrences per unit time when it is important for the brake assembly to operate as intended.

Optionally, the reference subset of occurrences per unit time when a braking operation is initiated corresponds to braking operations initiated by the safety system, preferably the reference subset of occurrences per unit time when a braking operation is initiated corresponds to braking operations only initiated by the safety system. Basing the reference subset of occurrences per unit time on operations initiated by the safety system implies that a relevant subset may be determined in a straightforward manner.

Optionally, the vehicle comprises a detector for detecting an object in front of the vehicle, the reference subset of occurrences per unit time when a braking operation is initiated corresponding to occurrences per unit time when a foreign object has been detected in front of the vehicle and in which a braking request has been issued in response thereto. The above implies an appropriate example set of occurrences per unit time when it is important for the brake assembly to operate as intended.

Optionally, the method further comprises issuing a communication verification signal verifying a communication between the safety system and the brake system. The communication verification signal is issued in accordance with a communication verification signal issuing schedule indicating at which time instances a communication verification signal should be issued from the safety system. The method further comprises assessing whether or not the communication verification signal has been received by the brake system. The above-mentioned communication verification signal can be used for verifying that a signals may be fed from the safety system to the brake system without necessarily braking the vehicle. This in turn implies that the integrity of the communication from the safety system to the brake system may be assessed relatively often without impairing the driving behaviour of the vehicle.

Optionally, the method further comprises detecting a retardation being the result of a brake request signal issued to the brake system for at least each braking operation in the subset of occurrences per unit time when a braking operation is initiated by the brake system. The detection of the retardation implies an appropriate way for assessing the reliability of the brake assembly.

Optionally, the vehicle further comprises a propulsion system and the method comprises issuing a propulsion request signal to the propulsion system at the same time as the brake request signal is issued from the safety system to the brake system in response to detecting that the actual braking operation density is lower than a braking operation reference density. The issuance of a propulsion request signal at the same time as the brake request signal implies that the reliability of the brake assembly may be assessed wit a limited, or even zero, change in speed of the vehicle.

Optionally, the method comprises issuing a brake request signal from the safety system to the brake system in accordance with a safety system signal issuing schedule indicating at which time instances a signal should be issued from the safety system, the safety system signal issuing schedule being determined on the basis of the braking operation reference density and including at least one time instance being separate from a time instance at which a brake request is issued from the nominal automation system. As such, the safety system signal issuing schedule may be used for ensuring that the reliability of the brake assembly is assessed sufficiently often, even when the brake assembly itself does not issue brake request signals in response to the prevailing driving conditions.

Optionally, the method comprises using a braking operation range indicative of at least soft braking, the subset of occurrences per unit time when a braking operation is initiated by the brake system per unit time excludes occurrences per unit time when soft braking is initiated.

Optionally, the method further comprises using braking operation ranges for each one of the following: medium braking and hard braking, the subset of occurrences per unit time when a braking operation is initiated by the brake system per unit time including occurrences per unit time when at least hard braking is initiated, preferably when medium braking or hard braking is initiated.

Optionally, the method further comprises: for each braking operation of the at least subset of occurrences per unit time forming the actual braking operation density:
  detecting a response of the brake system to the braking operation, and
  on the basis of at least the detected response, assessing the reliability of the brake assembly.

As such, a method according to the above also uses the braking operations, for instance issued by the nominal automation system and the safety system and which braking operations may be initiated whilst operating the vehicle, in order to assess reliability of the brake assembly.

A second aspect of the present invention relates to a method for assessing reliabilities of a brake assembly of a vehicle. The method comprises:
  selecting a plurality of different ranges for the brake request signal from the safety system to the brake system,
  for each one of the ranges, assessing reliability of a brake assembly of a vehicle in accordance with a method according to the first aspect of the present invention.

Optionally, the braking operation reference density is different for different ranges for the brake request signal.

A third aspect of the present invention relates to a computer program comprising program code means for performing the steps of any one of the first or second aspects of the present invention when the program is run on a computer.

A fourth aspect of the present invention relates to a computer readable medium carrying a computer program comprising program code means for performing the steps of any one of the first or second aspects of the present invention when the program product is run on a computer.

A fifth aspect of the present invention relates to a brake assembly for a vehicle. The brake assembly comprises a brake system, a nominal automation system and a safety system. The brake system is adapted to receive a brake request individually from each one of the nominal automation system and the safety system and in response to either request initiate a braking operation.

The brake assembly is adapted to:
  determine an actual braking operation density, the actual braking operation density being determined on the basis of at least a subset of occurrences per unit time when a braking operation is initiated by the brake system;
  in response to detecting that the actual braking operation density is lower than a braking operation reference density:
    issue a brake request from the safety system;
    detect a response of the brake system to the signal issued from the safety system and
    on the basis of at least the detected response, assess the reliability of the brake assembly.

Optionally, the brake assembly comprises a brake monitoring system. The brake monitoring system is adapted to receive brake request signals from nominal automation system and the safety system to thereby determine the actual braking operation density.

Optionally, the brake monitoring system, in response to detecting that the actual braking operation density is lower than a braking operation reference density, is adapted to:
issue a signal to the safety system to issue the brake request;
receive a signal indicative of the response of the brake system to the signal issued from the safety system and
on the basis of at least the detected response, assess the reliability of the brake assembly.

Optionally, brake assembly is adapted to receive a retardation signal from a retardation sensor of the vehicle and to detect the response of the brake system to the signal issued from the safety system using the retardation signal.

Optionally, the brake assembly is adapted to determine the braking operation reference density on the basis of an expected number of occurrences per unit time when a safety critical braking operation is to be initiated by the brake system. Preferably, the braking operation reference density is determined on the basis of the expected number of occurrences per unit time multiplied by a safety factor.

Optionally, the brake assembly is adapted to determine the braking operation reference density on the basis of a reference subset of occurrences per unit time when a braking operation is initiated by the brake system. The braking operation reference density is determined on the basis of the number of occurrences per unit time in the reference subset. Preferably, the braking operation reference density being indicative of the number of occurrences per unit time in the reference subset multiplied by a safety factor.

Optionally, the reference subset of occurrences per unit time when a braking operation is initiated corresponds to occurrences per unit time when a safety critical braking operation is initiated.

Optionally, the reference subset of occurrences per unit time when a braking operation is initiated corresponds to occurrences per unit time when a braking operation is initiated in an operating situation in which a failure to brake the vehicle is determined to result in personal injury of one or more persons related to the operating situation.

Optionally, the reference subset of occurrences per unit time when a braking operation is initiated corresponds to braking operations initiated by the safety system. Preferably, the reference subset of occurrences per unit time when a braking operation is initiated corresponds to braking operations only initiated by the safety system.

Optionally, the vehicle comprises a detector for detecting an object in front of the vehicle. The reference subset of occurrences per unit time when a braking operation is initiated corresponds to occurrences per unit time when a foreign object has been detected in front of the vehicle and in which a braking request has been issued in response thereto.

Optionally, the brake assembly is adapted to issue a communication verification signal verifying a communication between the safety system and the brake system. The communication verification signal is issued in accordance with a communication verification signal issuing schedule indicating at which time instances a communication verification signal should be issued from the safety system. The brake assembly is adapted to assess whether or not the communication verification signal has been received by the brake system.

Optionally, the vehicle further comprises a propulsion system and the brake assembly is adapted to issue a propulsion request signal to the propulsion system at the same time as the brake request signal is issued from the safety system to the brake system in response to detecting that the actual braking operation density is lower than a braking operation reference density.

Optionally, the brake system is adapted to issue a brake request signal from the safety system to the brake system in accordance with a safety system signal issuing schedule indicating at which time instances a signal should be issued from the safety system. The safety system signal issuing schedule is determined on the basis of the braking operation reference density and including at least one time instance being separate from a time instance at which a brake request is issued from the nominal automation system.

Optionally, the brake assembly is adapted to use a braking operation range indicative of at least soft braking, the subset of occurrences per unit time when a braking operation is initiated by the brake system per unit time excludes occurrences per unit time when soft braking is initiated.

Optionally, the brake assembly is adapted to use braking operation ranges for each one of the following: medium braking and hard braking. The subset of occurrences per unit time when a braking operation is initiated by the brake system per unit time includes occurrences per unit time when at least hard braking is initiated, preferably when medium braking or hard braking is initiated.

Optionally, the brake assembly is adapted to: for each braking operation of the at least subset of occurrences per unit time forming the actual braking operation density:
detect a response of the brake system to the braking operation, and
on the basis of at least the detected response, assess the reliability of the brake assembly.
Optionally, the brake assembly is adapted to:
select a plurality of different ranges for the brake request signal from the safety system to the brake system,
for each one of the ranges, assess reliability of a brake assembly of a vehicle in accordance with the fifth aspect of the present invention.

Optionally, the braking operation reference density is different for different ranges for the brake request signal.

A sixth aspect of the present invention relates to a vehicle comprising a brake assembly according to the fifth aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a brake assembly according to the present invention and/or for which the method of the present invention may be carried out.

However, the present invention may be implemented in a plurality of different types of vehicles. Purely by way of example, the present invention could be implemented in a truck, a tractor, a car, a bus, a work machine such as a wheel loader or any other type of construction equipment.

Figure 1:
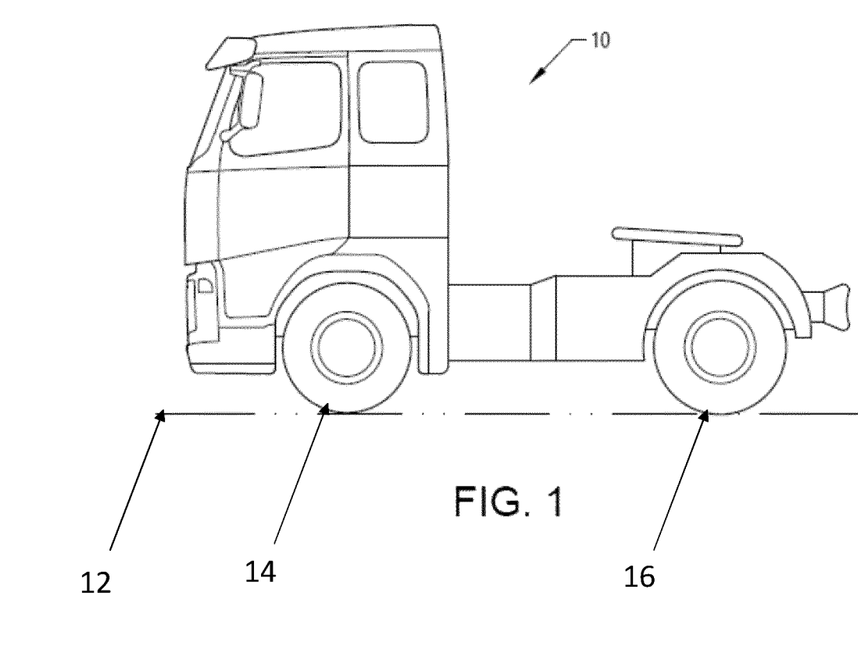
FIG. 1 schematically illustrates a vehicle.

A vehicle is generally adapted to be supported by a ground surface 12 and also generally comprises a plurality of wheels, which is exemplified in FIG. 1 by two wheels 14, 16. In order to control the operation of the vehicle 10, the vehicle may comprise a brake assembly that may be adapted to impart a braking torque to e.g. one or more ground engagement members, such as the FIG. 1 wheels 14, 16, of the vehicle 10.

Figure 2:
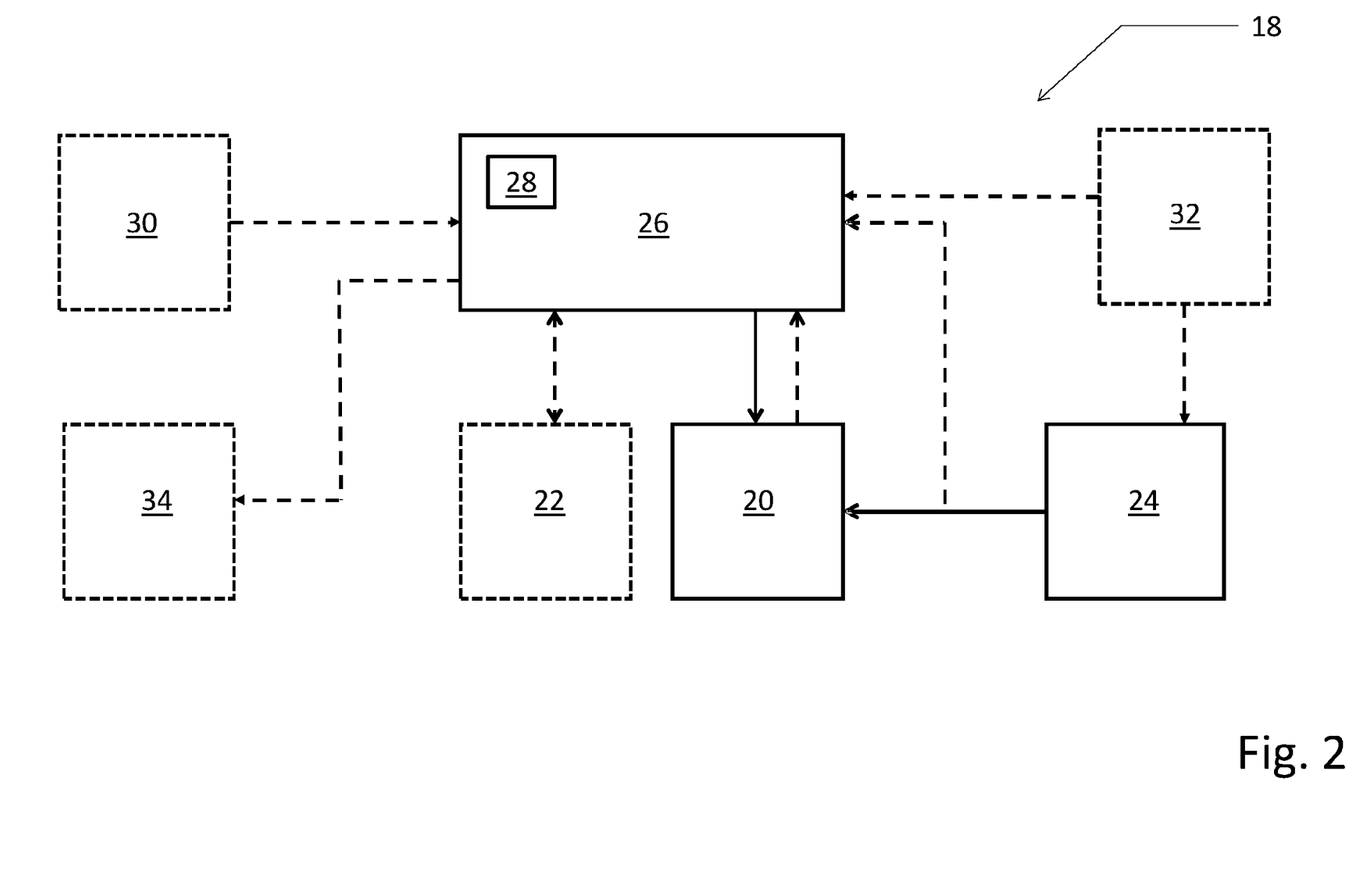
FIG. 2 schematically illustrates an embodiment of a brake assembly of the present invention.

FIG. 2 schematically illustrates an embodiment of a brake assembly 18 for a vehicle, such as the FIG. 1 vehicle 10. The brake assembly 18 comprises a brake system 20. Purely by way of example, the brake system may comprise, or even be constituted by, a service brake system adapted to impart a braking torque. As a non-limiting example, such a service brake system may comprise one or more disc brakes (not shown). Furthermore, as indicated in FIG. 2, the brake assembly 18 may also comprise a secondary brake system 22, such as a parking brake system.

Moreover, the brake assembly 18 further comprises a nominal automation system 24 and a safety system 26. The brake system 20 is adapted to receive a brake request individually from each one of the nominal automation system 24 and the safety system 26 and in response to either request initiate a braking operation. To this end, and as indicated in FIG. 2, the nominal automation system 24 may be connected to the brake system 20 such that signals may be fed from the nominal automation system 24 to the brake system 20. Purely by way of example, and as indicated by a dashed line in FIG. 2, the nominal automation system 24 may be also be connected to the safety system 26 such that signals may be fed from the nominal automation system 22 to the safety system 26.

Moreover, the safety system 26 may be connected to the brake system 20 such that signals may be fed from the safety system 26 to the brake system 20. Purely by way of example, and as indicated by a dashed line in FIG. 2, the brake system 20 may be also be connected to the safety system 26 such that signals may be fed from the brake system 20 to the safety system 26.

Although the above possible connections have been illustrated by connection lines in FIG. 2, it should be noted that the connections need not necessarily be implement by connection cables or the like. On the contrary, it is envisaged that one or more of the above-mentioned connections may be implemented by other means, such as a wireless connection and/or a connection via a so-called CAN bus (not shown).

During operation, braking operations may be initiated by the nominal automation system 24. Purely by way of example, the nominal automation system 24 may form part of an autonomous driving system (not shown in FIG. 2) which is adapted to automatically, alternatively semi-automatically, control the operation of the vehicle 10. Alternatively, in embodiments of the present invention, an operator may issue brake request signals to the nominal automation system 24, for instance via a brake pedal (not shown).

The safety system 26 may include a plurality of functions in order to ensure the safety of the brake assembly 18 and possibly also other components of the vehicle. Purely by way of example, brake assembly 18 may comprise a brake monitoring system 28 adapted to monitor the functioning of the brake assembly 18. In the embodiment illustrated in FIG. 2, the brake monitoring system 28 forms part of the safety system 26 but it is envisaged that in embodiments of the brake assembly 18, the brake monitoring system 28 may form part of another component or system of the brake assembly 18, or even constitute an individual entity of the brake assembly 18.

The brake assembly 18 according to the present invention is adapted to determine an actual braking operation density $d_A$. The actual braking operation density $d_A$ is determined on the basis of at least a subset of occurrences per unit time when a braking operation is initiated by the brake system 20. Purely by way of example, the subset of occurrences, or all occurrences, per unit time when a braking operation is initiated by the brake system 20 may be determined by the brake monitoring system 28, which in the FIG. 2 embodiment forms part of the safety system 26, by receiving a signal from the brake system 20 each time when a braking operation is initiated. Purely by way of example, such a signal may also include information as regards e.g. the type of the braking operation. As a non-limiting example, the signal may include information indicative of a requested and/or imparted braking torque associated with the braking operation.

Instead of, or in addition to, issuing signals from the brake system 20, the brake monitoring system 28 may be adapted to receive brake request information from the nominal automation system 24. As such, though purely by way of example, when the nominal automation system 24 issues a brake request signal to the brake system 20, a reference signal, which reference signal may be identical to the brake request signal or which may at least comprise information about the brake request signal, may be sent from the nominal automation system 24 to the brake monitoring system 28, which for instance may form part of the safety system 26. Moreover, the brake monitoring system 28 may for instance be adapted to register when the safety system 26 itself issues a brake request signal to the brake system 20.

It should also be noted that it is envisaged that in embodiments of the brake assembly 18, the actual braking operation density need not be determined by the safety system 26 and/or by the brake monitoring system 28 but rather by another system (not shown) forming part of the brake assembly 18.

Irrespective of how the brake assembly 18 determines the actual braking operation density $d_A$, the brake assembly 18 is such that, in response to detecting that the actual braking operation density $d_A$ is lower than a braking operation reference density $d_R$, the brake assembly 18 is adapted to:
  issue a brake request from the safety system 26;
  detect a response of the brake system to the signal issued from the safety system 26 and
  on the basis of at least the detected response, assess the reliability of the brake assembly 18.

As a non-limiting example, the reliability assessment for the response may by of the type "approved" or "not approved" depending on whether or not a retardation of the vehicle is within a retardation range expected for the brake request and the prevailing operating conditions of the vehicle. As another non-limiting example, the reliability may be expressed using a numerical value, e.g. an integer or a real value, depending on the result of the assessment.

Purely by way of example, when the brake assembly 18 comprises the brake monitoring system 28, such a brake monitoring system 28 may, in response to detecting that the actual braking operation density is lower than a braking operation reference density, be adapted to:
   issue a signal to the safety system to issue the brake request;
   receive a signal indicative of the response of the brake system to the signal issued from the safety system and on the basis of at least the detected response, assess the reliability of the brake assembly.

The response of the brake system to the signal issued from the safety system may be assessed in a plurality of different ways. Purely by way of example, and as indicated by dashed lines in FIG. 2, the vehicle 10 may comprise a retardation sensor 30 adapted to issue a signal indicative of a retardation of the vehicle 10. Purely by way of example, the retardation sensor 30 may be adapted to measure the wheel speed and/or deceleration of one or more wheels of the vehicle. As another non-limiting example, the retardation sensor 30 may instead, or in addition, be adapted to determine an overall speed of deceleration of the vehicle, for instance using a global positioning system, and on the basis thereof determine and issue a signal indicative of the retardation of the vehicle 10.

Irrespective of the implementation of the retardation sensor 30, the brake assembly 18 may be adapted to receive a retardation signal from the retardation sensor 30 of the vehicle 10 and to detect the response of the brake system 20 to the signal issued from the safety system 26 using the retardation signal.

Concerning the braking operation reference density $d_R$, the brake assembly 18 may be adapted to determine the braking operation reference density on the basis of an expected number of occurrences $N_E$ per unit time when a safety critical braking operation is to be initiated by the brake system. As a non-limiting example, the braking operation reference density $d_R$ may be determined on the basis of the expected number of occurrences $N_E$ per unit time multiplied by a safety factor SF such that $d_R=N_E*SF$. Purely by way of example, the safety factor SF may be equal to or greater than three, preferably equal to or greater than five. Furthermore, though again purely by way of example, the expected number of occurrences $N_E$ per unit time may be expressed as a number of occurrences per hour, number of occurrences per minute or any other time unit.

As a non-limiting example, the expected number of occurrences $N_e$ per unit time when a safety critical braking operation is to be initiated by the brake system may be based on historical data from the vehicle 10 or a fleet of vehicles. Moreover, though purely by way of example, the above-mentioned expected number of occurrences $N_E$ per unit time may be determined on the basis of e.g. a planned route and/or a planned travel time for the vehicle.

Instead of, or in addition to determining the braking operation reference density $d_R$ in accordance with the above, the brake assembly 18 may be adapted to determine the braking operation reference density $d_R$ on the basis of a reference subset of occurrences $N_R$ per unit time when a braking operation is initiated by the brake system 20. The braking operation reference density $d_R$ may be determined on the basis of the number of occurrences $N_R$ per unit time in the reference subset. Preferably, the braking operation reference density is indicative of the number of occurrences $N_R$ per unit time in the reference subset per unit time multiplied by a safety factor SF such that $d_R=N_R*SF$.

Purely by way of example, the reference subset of occurrences $N_R$ per unit time when a braking operation is initiated corresponds to occurrences when a safety critical braking operation is initiated. A safety critical braking operation may be determined in a plurality of different ways. As a non-limiting example, the reference subset of occurrences $N_R$ per unit time when a braking operation is initiated may correspond to occurrences per unit time when a braking operation is initiated in an operating situation in which a failure to brake the vehicle is determined to result in personal injury of one or more persons related to the operating situation.

As another non-limiting example, the reference subset of occurrences $N_R$ per unit time when a braking operation is initiated corresponds to braking operations initiated by the safety system 26. Preferably, the reference subset of occurrences $N_R$ per unit time when a braking operation is initiated corresponds to braking operations only initiated by the safety system 26.

As a further non-limiting example, the vehicle 10 may comprise a detector 32 for detecting an object (not shown) in front of the vehicle 10. As indicated in FIG. 2, the detector 32 may be adapted to issue a signal to at least one, but preferably each one, of the nominal automation system 24 and the safety system 26. The reference subset of occurrences $N_R$ per unit time when a braking operation is initiated may correspond to occurrences per unit time when a foreign object has been detected in front of the vehicle and in which a braking request has been issued in response thereto. Such a braking request may be issued from each either one of the nominal automation system 24 and the safety system 26. However, in preferred embodiments of the present invention, the detector 32 may issue a foreign object detection signal to the safety system 26 which in turn issues a brake request signal to the brake system 20.

It is also envisaged that the braking operation reference density $d_R$ may be determined by combining the expected number of occurrences $N_E$ per unit time and the reference subset of occurrences $N_R$ per unit time. Purely by way of example, when starting a driving operation for a vehicle, the braking operation reference density $d_R$ may initially be set on the basis of the expected number of occurrences $N_E$ per unit time. Thereafter, as the vehicle 10 is in driving scenarios involving different types of braking operations, the braking operation reference density $d_R$ may instead be based on the above-mentioned reference subset of occurrences $N_R$ per unit time.

Instead of, or in addition to, the issuance of a brake request from the safety system 26 in response to detecting that the actual braking operation density $d_A$ is lower than a braking operation reference density $d_R$, the brake assembly 18 may be adapted to issue a communication verification signal verifying a communication between the safety system and the brake system. The communication verification signal is issued in accordance with a communication verification signal issuing schedule indicating at which time instances a communication verification signal should be issued from the safety system 26. The brake assembly 18 is adapted to assess whether or not the communication verification signal has been received by the brake system 20. Purely by way of example, the communication verification signal may be regarded as a "pulse signal" or "heartbeat signal" that is issued from the safety system 26 to the brake system 20 at a relatively high frequency.

Irrespective of how e.g. the braking operation reference density $d_R$ is determined, the assessment of the reliability of the brake assembly 18 may be carried out at low speed or even at zero speed. To this end, and as schematically indicated in FIG. 2, the vehicle 10 may further comprise a propulsion system 34. Purely by way of example, such a propulsion system may comprise an internal combustion engine and/or an electric motor being adapted to propel one or more of the wheels of the vehicle 10. Moreover, the brake assembly 18, for instance the safety system 26, may be adapted to issue a propulsion request signal to the propulsion system at the same time as the brake request signal is issued from the safety system 26 to the brake system 20 in response to detecting that the actual braking operation density is lower than a braking operation reference density.

Purely by way of example, the brake assembly 18 may be adapted to issue a brake request signal from the safety system 26 to the brake system 20 in accordance with a safety system signal issuing schedule indicating at which time instances a signal should be issued from the safety system. The safety system signal issuing schedule is determined on the basis of the braking operation reference density and including at least one time instance being separate from a time instance at which a brake request is issued from the nominal automation system.

As another non-limiting example, the brake assembly 18 may be adapted to use a braking operation range indicative of at least soft braking. The subset of occurrences per unit time when a braking operation is initiated by the brake system per unit time may exclude occurrences per unit time when soft braking is initiated. Put differently, a soft braking may be deemed not to relate to e.g. a safety critical braking operation requiring that the reliability of the brake assembly needs to be assessed more often. Purely by way of example, a distinction between soft braking and non-soft braking may be based on the brake torque, brake force or another comparable brake action indicative entity. A value of such a brake action indicative entity being equal to or lower than a predetermined threshold may be deemed to relate to a soft braking. The brake action indicative entity may for instance relate to an issued brake request signal or an actual brake action imparted by the brake system. As another non-limiting example, a distinction between soft braking and not soft braking may be based on a retardation level resulting from a braking operation.

Purely by way of example, the brake assembly is adapted to use braking operation ranges for the braking operation initiated by the brake system 20, the brake assembly 18 may be adapted to use braking operation ranges for each one of the following: medium braking and hard braking. The subset of occurrences per unit time when a braking operation is initiated by the brake system per unit time includes occurrences per unit time when at least hard braking is initiated, preferably when medium braking or hard braking is initiated.

As another non-limiting example, the brake assembly 18 may be adapted to: for each braking operation of the at least subset of occurrences per unit time forming the actual braking operation density $d_A$:
  detect a response of the brake system 20 to the braking operation, and
  on the basis of at least the detected response, assess the reliability of the brake assembly 18.

Instead of, or in addition to, using braking operation ranges when determining the braking operation reference density $d_R$, braking operation ranges may also be used such that the reliability of the brake assembly is assessed for different braking operation ranges. As such, the brake assembly 18 may be adapted to:
  Select a plurality of different ranges for the brake request signal from the safety system to the brake system. Again, examples of such ranges may be soft, medium and hard braking. Purely by way of example, the brake request signal may be indicative of a desired brake torque and the limits of each range may be determined by e.g. an upper and lower brake torque threshold.
  For each one of the ranges, assess reliability of a brake assembly of a vehicle, for instance using any one of the embodiments presented hereinabove.

Purely by way of example, the braking operation reference density may be different for different ranges for the brake request signal. As an example, in order to assess the reliability of the brake assembly for soft braking, the corresponding braking operation reference density may be relatively high in order to ensure that the assessment is made more often than the occurrence per unit time of actual braking actions. On the other hand, the braking operation reference density for hard braking may be relatively low.

Figure 3:
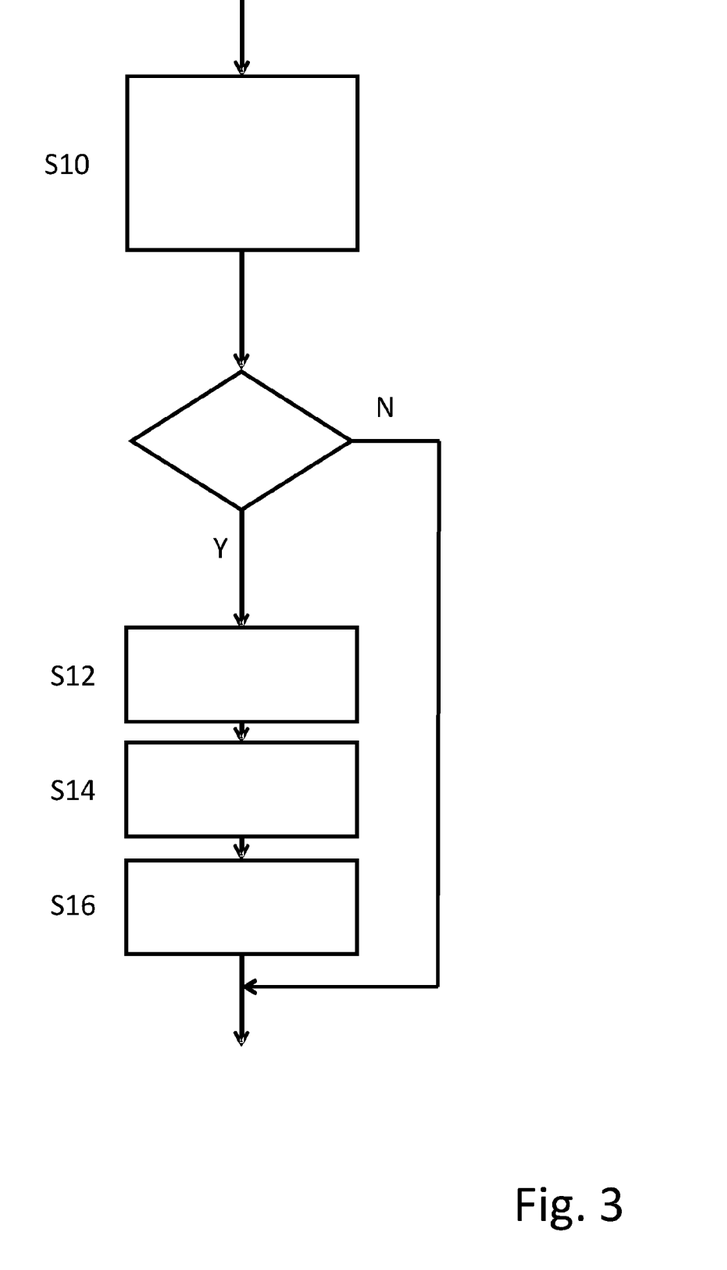
FIG. 3 is a flow chart illustrating an embodiment of a method of the present invention.

FIG. 3 illustrates a flow chart for an embodiment of a method in accordance with the present invention. As such, FIG. 3 is a flow chart indicative of a method for assessing reliability of a brake assembly 18 of a vehicle 10. The brake assembly 18 comprises a brake system 20, a nominal automation system 24 and a safety system 26. The brake system 20 is adapted to receive a brake request individually from each one of the nominal automation system 24 and the safety system 26 and in response to either request initiate a braking operation.

The method comprises:
  S10 determining an actual braking operation density $d_A$, the actual braking operation density being determined on the basis of at least a subset of occurrences per unit time when a braking operation is initiated by the brake system;
  in response to detecting that the actual braking operation density $d_A$ is lower than a braking operation reference density $d_R$ (yes in FIG. 3):
  S12 issuing a brake request from the safety system 26;
  S14 detecting a response of the brake system to the signal issued from the safety system 26, and
  S16 on the basis of at least the detected response, assessing the reliability of the brake assembly 18.

As has been intimated hereinabove, embodiments of the method may comprise assessing the reliability of said brake assembly 18 for at least a number of braking operations during operation of the vehicle. As such, embodiments of the method according to the present invention may comprise: for each braking operation of the at least subset of occurrences per unit time forming the actual braking operation density $d_A$:
  detecting a response of the brake system 20 to the braking operation, and
  on the basis of at least the detected response, assessing the reliability of the brake assembly 18.

Purely by way of example, the above method may be implemented by means of a computer program comprising program code means for performing the steps of the method when the program is run on a computer.

As another non-limiting example, a computer readable medium carrying a computer program comprising program code means for performing the steps of any one of the first or second aspects of the present invention when the program product is run on a computer.

It is to be understood that the present invention is not limited to the embodiments described above and illustrated in the drawings; rather, the skilled person will recognize that many changes and modifications may be made within the scope of the appended claims.

The invention claimed is:

1. A method for assessing reliability of a brake assembly of a vehicle, the brake assembly comprising a brake system, a nominal automation system and a safety system, the brake system being adapted to receive a brake request individually from each one of the nominal automation system and the safety system, and in response to either request initiate a braking operation, the method comprising:

determining an actual braking operation density, the actual braking operation density being determined on the basis of at least a subset of occurrences per unit time when a braking operation is initiated by the brake system; and     in response to detecting that the actual braking operation density is lower than a braking operation reference density:

issuing a brake request from the safety system;

detecting a response of the brake system to the signal issued from the safety system; and         on the basis of at least the detected response, assessing the reliability of the brake assembly.

2. The method of claim 1, wherein the braking operation reference density is determined on the basis of an expected number of occurrences per unit time when a safety critical braking operation is to be initiated by the brake system, preferably the braking operation reference density is determined on the basis of the expected number of occurrences per unit time multiplied by a safety factor.

3. The method of claim 1, wherein the braking operation reference density is determined on the basis of a reference subset of occurrences per unit time when a braking operation is initiated by the brake system, the braking operation reference density being determined on the basis of the number of occurrences per unit time in the reference subset, preferably the braking operation reference density being indicative of the number of occurrences per unit time in the reference subset multiplied by a safety factor.

4. The method of claim 3, wherein the reference subset of occurrences per unit time when a braking operation is initiated corresponds to occurrences per unit time when a safety critical braking operation is initiated.

5. The method of claim 3, wherein the reference subset of occurrences per unit time when a braking operation is initiated corresponds to occurrences per unit time when a braking operation is initiated in an operating situation in which a failure to brake the vehicle is determined to result in personal injury of one or more persons related to the operating situation.

6. The method of claim 3, wherein the reference subset of occurrences per unit time when a braking operation is initiated corresponds to braking operations initiated by the safety system, preferably the reference subset of occurrences per unit time when a braking operation is initiated corresponds to braking operations only initiated by the safety system.

7. The method of claim 3, wherein the vehicle comprises a detector for detecting an object in front of the vehicle, the reference subset of occurrences per unit time when a braking operation is initiated corresponding to occurrences per unit time when a foreign object has been detected in front of the vehicle and in which a braking request has been issued in response thereto.

8. The method of claim 1, wherein the method further comprises issuing a communication verification signal verifying a communication between the safety system and the brake system, the communication verification signal being issued in accordance with a communication verification signal issuing schedule indicating at which time instances a communication verification signal should be issued from the safety system, the method further comprising assessing whether or not the communication verification signal has been received by the brake system.

9. The method of claim 1, further comprising detecting a retardation being the result of a brake request signal issued to the brake system for at least each braking operation in the subset of occurrences per unit time when a braking operation is initiated by the brake system.

10. The method of claim 1, wherein the vehicle further comprises a propulsion system and the method further comprises issuing a propulsion request signal to the propulsion system at the same time as the brake request signal is issued from the safety system to the brake system in response to detecting that the actual braking operation density is lower than a braking operation reference density.

11. The method of claim 1, further comprising issuing a brake request signal from the safety system to the brake system in accordance with a safety system signal issuing schedule indicating at which time instances a signal should be issued from the safety system, the safety system signal issuing schedule being determined on the basis of the braking operation reference density and including at least one time instance being separate from a time instance at which a brake request is issued from the nominal automation system.

12. The method of claim 1, wherein the method further comprises using a braking operation range indicative of at least soft braking, the subset of occurrences per unit time when a braking operation is initiated by the brake system per unit time excludes occurrences per unit time when soft braking is initiated.

13. The method of claim 12, wherein the method further comprises using braking operation ranges for each one of the following: medium braking and hard braking, the subset of occurrences per unit time when a braking operation is initiated by the brake system per unit time including occurrences per unit time when at least hard braking is initiated, preferably when medium braking or hard braking is initiated.

14. The method of claim 1, wherein the method further comprises:

for each braking operation of the at least subset of occurrences per unit time forming the actual braking operation density:

detecting a response of the brake system to the braking operation; and         on the basis of at least the detected response, assessing the reliability of the brake assembly.

15. A method for assessing reliabilities of a brake assembly of a vehicle, the method comprising:

selecting a plurality of different ranges for the brake request signal from the safety system to the brake system; and     for each one of the ranges, assessing reliability of a brake assembly of a vehicle in accordance with any one of the preceding claims.

16. The method of claim 15, whereby the braking operation reference density is different for different ranges for the brake request signal.

17. A computer program comprising program code means for performing the steps of claim 1 when the program is run on a computer.

18. A computer readable medium carrying a computer program comprising program code means for performing the steps of claim 1 when the program product is run on a computer.

19. A brake assembly for a vehicle, the brake assembly comprising a brake system, a nominal automation system and a safety system, the brake system being adapted to receive a brake request individually from each one of the nominal automation system and the safety system and in response to either request initiate a braking operation, the brake assembly being adapted to:
  determine an actual braking operation density, the actual braking operation density being determined on the basis of at least a subset of occurrences per unit time when a braking operation is initiated by the brake system; and
  in response to detecting that the actual braking operation density is lower than a braking operation reference density:
    issue a brake request from the safety system;
    detect a response of the brake system to the signal issued from the safety system; and
    on the basis of at least the detected response, assess the reliability of the brake assembly.

20. The brake assembly of claim 19, wherein the brake assembly further comprises a brake monitoring system, the brake monitoring system being adapted to receive brake request signals from the nominal automation system and the safety system to thereby determine the actual braking operation density.

21. The brake assembly of claim 20, wherein the brake monitoring system, in response to detecting that the actual braking operation density is lower than a braking operation reference density, is adapted to:
  issue a signal to the safety system to issue the brake request;
  receive a signal indicative of the response of the brake system to the signal issued from the safety system; and
  on the basis of at least the detected response, assess the reliability of the brake assembly.

22. The brake assembly of claim 19, wherein the brake assembly is adapted to receive a retardation signal from a retardation sensor of the vehicle and to detect the response of the brake system to the signal issued from the safety system using the retardation signal.

23. The brake assembly of claim 19, wherein the brake assembly is adapted to determine the braking operation reference density on the basis of an expected number of occurrences per unit time when a safety critical braking operation is to be initiated by the brake system, preferably the braking operation reference density is determined on the basis of the expected number of occurrences per unit time multiplied by a safety factor.

24. The brake assembly of claim 19, wherein the brake assembly is adapted to determine the braking operation reference density on the basis of a reference subset of occurrences per unit time when a braking operation is initiated by the brake system, the braking operation reference density being determined on the basis of the number of occurrences per unit time in the reference subset, preferably the braking operation reference density being indicative of the number of occurrences per unit time in the reference subset multiplied by a safety factor.

25. The brake of claim 19, wherein the reference subset of occurrences per unit time when a braking operation is initiated corresponds to occurrences per unit time when a safety critical braking operation is initiated.

26. The brake assembly of claim 19, wherein the reference subset of occurrences per unit time when a braking operation is initiated corresponds to occurrences per unit time when a braking operation is initiated in an operating situation in which a failure to brake the vehicle is determined to result in personal injury of one or more persons related to the operating situation.

27. The brake assembly of claim 19, wherein the reference subset of occurrences per unit time when a braking operation is initiated corresponds to braking operations initiated by the safety system, preferably the reference subset of occurrences per unit time when a braking operation is initiated corresponds to braking operations only initiated by the safety system.

28. The brake assembly of claim 19, wherein the vehicle comprises a detector for detecting an object in front of the vehicle, the reference subset of occurrences per unit time when a braking operation is initiated corresponding to occurrences per unit time when a foreign object has been detected in front of the vehicle and in which a braking request has been issued in response thereto.

29. The brake assembly of claim 19, wherein the brake assembly is adapted to issue a communication verification signal verifying a communication between the safety system and the brake system, the communication verification signal being issued in accordance with a communication verification signal issuing schedule indicating at which time instances a communication verification signal should be issued from the safety system, the brake assembly is adapted to assess whether or not the communication verification signal has been received by the brake system.

30. The brake assembly of claim 19, wherein the vehicle further comprises a propulsion system and the brake assembly is adapted to issue a propulsion request signal to the propulsion system at the same time as the brake request signal is issued from the safety system to the brake system in response to detecting that the actual braking operation density is lower than a braking operation reference density.

31. The brake assembly of claim 19, wherein the brake system is adapted to issue a brake request signal from the safety system to the brake system in accordance with a safety system signal issuing schedule indicating at which time instances a signal should be issued from the safety system, the safety system signal issuing schedule being determined on the basis of the braking operation reference density and including at least one time instance being separate from a time instance at which a brake request is issued from the nominal automation system.

32. The brake assembly of claim 19, wherein the brake assembly is adapted to use a braking operation range indicative of at least soft braking, the subset of occurrences per unit time when a braking operation is initiated by the brake system per unit time excludes occurrences per unit time when soft braking is initiated.

33. The brake assembly of claim 19, wherein the brake assembly is adapted to use braking operation ranges for each one of the following: medium braking and hard braking, the subset of occurrences per unit time when a braking operation is initiated by the brake system per unit time including occurrences per unit time when at least hard braking is initiated, preferably when medium braking or hard braking is initiated.

34. The brake assembly of claim 19, wherein the brake assembly is adapted to: for each braking operation of the at least subset of occurrences per unit time forming the actual braking operation density:
  detect a response of the brake system to the braking operation; and
  on the basis of at least the detected response, assess the reliability of the brake assembly.

35. The brake assembly of claim 19, wherein the brake assembly is adapted to:
  select a plurality of different ranges for the brake request signal from the safety system to the brake system; and
  for each one of the ranges, assess reliability of a brake assembly of the vehicle.

36. The brake assembly of claim 35, whereby the braking operation reference density is different for different ranges for the brake request signal.

37. A vehicle comprising the brake assembly of claim 19.

* * * * *